United States Patent Office 3,032,475
Patented May 1, 1962

3,032,475
METHOD OF HYDROXYLATING STEROIDS
Joseph L. Sardinas, Brooklyn, N.Y., assignor to Chas. Pfizer & Co. Inc., New York, N.Y., a corporation of Delaware
No Drawing. Filed June 3, 1959, Ser. No. 817,731
8 Claims. (Cl. 195—51)

The present invention relates to a novel method for the introduction of a hydroxyl group into a steroid molecule and, more particularly, to a method for the introduction of a 16α-hydroxyl group into a steroid molecule by a microbiological method. This application is a continuation-in-part of my earlier filed copending U.S. patent application Serial Number 773,165, filed November 12, 1958, and now abandoned.

Prior to this invention it was known that certain microorganisms hydroxylate steroids in the 16-position to produce useful compounds. The introduction of a 16α-hydroxyl group into a steroid molecule by means of an unidentified actinomycete has been described by Perlman, Titus and Fried in the Journal of the American Chemical Society, 74, 2126 (1952). More recently, the 16α-hydroxylation of steroids has been reported by Thoma et al., in the Journal of the American Chemical Society, 79, 4818 (1957) using *Streptomyces roseochromogenus*.

It is an object of the present invention to provide a novel method for the introduction of a hydroxyl group into a steroid molecule. Another object of the invention is the provision of such method whereby a 16-desoxy steroid (the term "16-desoxy steroid" is employed throughout to indicate a steroid which contains no oxygen in the 16-position) is converted to a 16-hydroxylated steroid by the action of species of microorganisms of the genus Strempromyces. Another object of the invention is the provision of a process for the introduction of a hydroxyl group into at least the 16-position of a 16-desoxy steroid through the action of microorganisms of the genus Streptomyces. Another object of the invention is to provide a process of hydroxylating 3-keto steroids by means of Streptomyces. Another object of the invention is the provision of a process for the 16α-hydroxylation of 9α-fluoro-3-keto steroids.

It has been found that 16-desoxy steroids of the pregnane, androstane and estrogen series, including pregnenes and androstenes, can be readily converted to the corresponding 16α-hydroxylated derivatives in good yield by subjecting the appropriate steroid compound to the action of a species of the genus Streptomyces. By the method of the present invention, an efficient, economical and commercially feasible method of introducing a hydroxyl group into the 16-position of a 16-desoxy steroid molecule is provided. Accordingly, a novel and simple approach to the production of 16α-hydroxylated steroid drugs is afforded which is of great importance to the chemical, pharmaceutical and medical professions, and of a special value in the treatment of physiological abnormalities known to be beneficially affected only by such 16-hydroxylated steroids.

In its broader aspect, the method of the present invention consists in fermenting a 16-desoxy steroid by means of species of microorganisms of the genus Streptomyces believed to be closely related to the new species *Streptomyces mediocidicus*, Okami et al., described in The Journal of Antibiotics, Ser. A, 7 (3), 98–103 (1954). For complete classification, the two microorganisms useful in the process of this invention were planted in replicates of 6 on media normally used for identification of such microorganisms and incubated at the proper temperature for two weeks. Readings of the media were made at appropriate times and final records were made after two weeks' incubation in the accepted fashion. Cultures of the microorganisms have been deposited in the American Type Culture Collection, Washington, D.C., and added to its collection of microorganisms as ATCC No. 13278 and ATCC No. 13279, respectively. Microorganisms ATCC 13278 and ATCC 13279 were isolated from soil samples collected in Coeur d'Alene, County of Kootenai, Idaho, and Arthur, County of Cass, North Dakota, respectively.

TABLE I.—CULTURAL CHARACTERISTICS OF STREPTOMYCES ATCC 13278

| Medium | Amount of growth | Aerial mycelium and sporulation | Soluble pigment | Remarks |
|---|---|---|---|---|
| Pridham's | Good | Good, buff cream | Lacking | Vegetative mycelium colorless; spores borne in long wavy chains, singly or in pairs; spores small, spherical, 0.5μ in diameter, to cylindrical 0.65–1.0 x 1.30μ, or broadly elliptical with the same dimensions; formed by fragmentation. |
| Skimmed milk | Moderate | Good; white | Brown | Vegetative mycelium cream to yellowish brown; milk coagulated and peptonized (one half of tube) pH change from pH 6.4 to pH 7.7. |
| Glucose agar | Good | Good; white to creamy | Yellow-brown | Vegetative mycelium colorless; reverse yellowish-tan; growth smooth. |
| Nutrient agar | Moderate | Moderate; white to creamy | None | Vegetative mycelium colorless where visible; reverse colorless. |
| Synthetic agar | do | do | Lacking | Vegetative mycelium colorless where visible; reverse whitish. |
| Calcium malate | do | Good; yellowish white to creamy | Tan-yellowish | Vegetative mycelium not visible; reverse whitish; malate digested. |
| Cellulose | No growth | | | |
| Potato plugs | Good | Good; white to tannish gray | Yellowish brown; plug becoming brown to near black. | Vegetative mycelium yellowish olive. |
| Starch plates | Poor | Poor; yellowish white | Lacking | Vegetative mycelium yellowish; reverse yellow; zone of hydrolysis partial, 2.0 cm. in diameter. |
| Gelatin plates | Moderate | Good; creamy | Light brown olive | Vegetative mycelium yellowish-tan; no liquefaction; reverse yellowish-tan. |
| Glucose asparagine plates. | do | Very sparse to moderate; white | Lacking | Vegetative mycelium cream to yellowish; reverse yellow. |
| Dextrose nitrate | Good | Good; white | do | Vegetative mycelium odorless; slight reduction of nitrates to nitrites. |

TABLE II.—CULTURAL CHARACTERISTICS OF STREPTOMYCES ATCC 13279

| Medium | Amount of growth | Aerial mycelium and sporulation | Soluble pigment | Remarks |
|---|---|---|---|---|
| Alpha-cellulose agar. | Poor | Poor, white | Lacking | Vegetative mycelium colorless; spores borne in long straight chains; formed singly or in pairs along hyphae; spores cylindrical 0.66 x 1.34; formed by fragmentation. |
| Skimmed milk | Good | Moderate, white | Yellowish brown | Vegetative mycelium cream to tan to yellowish brown; milk coagulated, partially to completely peptonized; pH change from pH 6.4 to pH 7.2. |
| Glucose agar | do | Good, creamy | Yellowish | Vegetative mycelium colorless where visible; reverse yellowish. |
| Nutrient agar | Moderate | Moderate; powder, white, scattered along slant. | Slight gray to brown | Vegetative mycelium colorless, reverse colorless. |
| Synthetic agar | do | Good, creamy | Lacking | Vegetative mycelium colorless; reverse colorless, pin point type of growth. |
| Cellulose | No growth | | | |
| Calcium malate agar. | Moderate | Moderate, creamy | Lacking | Vegetative mycelium colorless; reverse colorless, pin point type of growth; malate digested. |
| Potato plugs | Good | Good, white to yellowish to pale olive-gray. | Slight olive to blackish. | Vegetative mycelium deep orange yellow to grayish-tan; reverse dark yellow-olive; growth wrinkled and slightly rimose in sectors. |
| Dextrose nitrate broth. | do | Good, white | Lacking | Vegetative mycelium colorless to yellowish; nitrates reduced to nitrites. |
| Emerson agar | Moderate or good | Creamy | Yellowish brown | Vegetative mycelium colorless where visible; reverse yellowish-tan. |
| Glucose asparagine plates. | Poor to moderate | Lacking | Lacking | Vegetative mycelium bright orange; reverse orange, colony raised and merulioid. |
| Starch plates | do | do | do | Vegetative mycelium yellow-orange; reverse yellow-orange; zone of hydrolysis 2.0 cm. in diameter. |
| Gelatin plates | Moderate | Good, white | Dark brown | Vegetative mycelium not visible; reverse yellowish cream; no liquefaction. |
| Yeast extract | Very poor, almost no growth. | | | |

ATCC 13278 differs from the description of *S. mediocidicus*, Okami et al., in that it has a soluble pigment on potato slants and aerial mycelium on nutrient agar, whereas Okami's culture lacked these characteristics. ATCC 13278 did not liquefy gelatin, whereas Okami's culture did liquefy gelatin.

ATCC 13279 closely resembles ATCC 13278 except for having more nearly white aerial mycelium and spores and in having yellowish-orange vegetative mycelium on glucose-asparagine agar and on starch plates.

The reaction of the present invention may also be referred to as "oxygenation" since an oxygen atom is introduced into the steroid nucleus. An important advantage of the present invention is the hydroxylation of 16-desoxy steroids in the 16α-position. In addition to the 16-position, other positions may simultaneously be hydroxylated by the method of the present invention and, for operativeness in the process need only contain a nuclear non-hydroxylated or hydroxylatable-position, such as, a non-hydroxylated 16-position; illustratively, a methylene group as in a 16-desoxy steroid. Such compounds may contain double bonds in the 1, 4, 6, 9 (11 and 14 positions or combinations of these positions about the nucleus; "an aromatic A-ring"; or double bonds saturated by the addition of hypohalous acids or hydrogen halides; a halogen atom in the 9 position; hydroxy and alkoxy groups in the 9, 11, 14, 17 and 21 positions; 3, 11, 17 or 20 keto groups, methyl groups in the 2 position or an ethinyl group at the 17 position. Steroids having from 18 up to and including 22 carbon atoms in the carbon to carbon skeleton or steroids having a 3 carbon atom side chain at the 17 position and a 16-methylene group are included within the purview of those steroids which may be utilized as starting materials in the present invention. The process of this invention represents the first known instance in which an aromatic A-ring steroid has been hydroxylated by microbiological means.

Representative steroids which may be fermented by the method of the present invention include, for example:

Estradiol
Estrone
Corticosterone
Desoxycorticosterone
17-hydroxy-11-dehydrocorticosterone (cortisone)
Andrenosterone
3-hydroxybisnorcholenic acid
3-acetoxy-5-etiocholenic acid
Dehydroisoandrosterone
17-ethynyltestosterone
$\Delta^4$-androstene-3,17-dione
Testosterone
9α-fluorohydrocortisone
9α-fluoroprednisolone
9α-chlorohydrocortisone
$\Delta^{4,9(11)}$-pregnadiene-17α,21-diol-3,20-dione
9α-bromohydrocortisone
$\Delta^{4,7,9(11)}$-pregnatriene-17α,21-diol-3,20-dione
9α-bromocortisone
$\Delta^{4,6,8}$-pregnatriene-17α,21-diol-3,20-dione
11-epihydrocortisone
9α-fluorocortisone
9α-methoxycortisone
9α-ethoxyhydrocortisone
9α-methoxyhydrocortisone
$\Delta^{1,4}$-pregnadiene-11β,17α,21-triol-3,20-dione
6α-fluoro-$\Delta^4$-pregnene-11β,17α,21-triol-3,20-dione
2α-methyl-6α-fluorohydrocortisone
$\Delta^{4,6}$-hydrocortisone
$\Delta^1$-6α-methylhydrocortisone
6α-methylhydrocortisone
6α-methyl-$\Delta^4$-pregnene-17α,21-diol-3,11,20-trione
19-nortestosterone
2α-methyl-6β-fluoro-$\Delta^4$-pregnene-17α,21-diol-3,11,20-trione
11β,17α,21-trihydroxyprogesterone
9α-fluoro-17β-pyruvoyl-$\Delta^4$-androstene-11β,17α-diol-3-one These compounds are all known or can be prepared by procedures well known in the art. Halogen and alkoxy substituents are introduced using the well known route of Fried and Sabo set forth in the Journal of the American Chemical Society, 79, 1130 (1957). The compounds 9α-fluoro-$\Delta^{1,4}$-hydrocortisone, 9α-fluoro-$\Delta^{4,6}$-hydrocortisone, 9α-fluoro-$\Delta^{1,4}$-21-desoxy-hydrocortisone and 9α-fluoro-$\Delta^{4,6}$-21-desoxy-hydrocortisone are prepared by the method of Fried et al., the Journal of the American Chemical Society, 77, 4181 (1955). Oxidation with chromium trioxide in acetic acid gives the corresponding 11-keto compounds. A variety of 6-methyl compounds can be prepared by the method of Spero et al. as described in the Journal of the American Chemical Society, 78, 6213 (1956). These include, for example, 6α-methyl-11-ketoprogesterone, 6α-methyl-hydrocortisone acetate and 6α-methyl-prednisolone acetate all of which may be oxidized to the corresponding 11-keto compounds with N-bromoacetamide in pyridine. Meystre et al. in Helvetica Chimica Acta. vol. XXXIX, page 734, describe a method for introducing double bonds at the 1-position of Δ⁴-3-ketosteroids or the 1- and 4-positions of A-ring saturated 3-ketosteroids using selenium dioxide. Shull, Kita and Davisson in U.S. Patent No. 2,658,023 describe a microbiological method using an organism of the genus Curvularia whereby a β-hydroxyl group may be introduced at the 11-position of a variety of steroids.

A double bond at the 6-position of many steroid compounds can be obtained with chloranil in refluxing n-amyl alcohol by the method of Agnello and Laubach set forth in the Journal of the American Chemical Society, 79, 1257 (1957). A double bond at the 1-position of a variety of steroid compounds can be prepared by the bio-synthetic conversion reported by Bernstein and Lenhard, U.S. Patent No. 2,789,118. A variety of other 6-methylated compounds useful as starting materials for the compounds of this invention including, for example, 6α-methyl-9α-fluoro-hydrocortisone and the corresponding prednisolone analogs can be prepared by the method of Spero et al., as described in the Journal of the American Chemical Society, 79, 1515 (1957). These compounds, and other 6-dihydro compounds described above are converted to Δ⁶-compounds by the method of Agnello and Laubach.

Certain of the 2α-methyl compounds which are useful as starting materials for the preparation of the useful compounds of this invention are described by Hogg et al., in the Journal of the American Chemical Society, 77, 4438 and 6401 (1955).

A recently issued series of United States patents describes the preparation of a large number of 6-fluoro steroid compounds. These include not only basic hydrocortisone, cortisone, progesterone, desoxycorticosterone, corticosterone and progesterone compounds with halgen at the 6-position, but also a wide variety of compounds with other substituents on the molecules such as 2-methyl and 9-halo. Specific patents from this series which describe compounds useful as starting materials in this invention are:

| | |
|---|---|
| 2,838,496 | 2,838,528 |
| 2,838,498 | 2,838,536 |
| 2,838,499 | 2,838,540 |
| 2,838,501 | 2,838,541 |
| 2,838,502 | |

The 16α-hydroxylation is effected by contacting a steroid compound of the type described above with the oxygenating activity of the selected microorganism; i.e., with the organism itself or with the enzyme system of the organism.

The effectiveness of the steroid-hydroxylating microorganisms for the process of this invention may be determined by cultivating the organism in a suitable nutrient medium containing a carbohydrate source such as sugars, starch and glycerol, an organic nitrogen source such as soy bean meal, cotton seed meal, peanut meal and cornsteep liquor, and mineral salts such as sodium chloride, sodium nitrate, magnesium sulfate and potassium phosphate. In addition to these, a buffering agent, such as calcium carbonate or potassium dihydrogen phosphate, and a foam preventer such as vegetable oils or animal oils may be used. The organism is best grown under submerged conditions of agitation and aeration at temperature ranging from about 23° C. to about 32° C., but preferably from about 26° C. to about 30° C. The preferred pH range is from 6 to 7. During the fermentation, the broth is agitated with stirrers of suitable design for incorporating air into the broth. Aeration at a rate of from about ½ to 2 volumes of air per volume per minute produces satisfactory results. The steroid compound as a solid or as a solution in a suitable solvent, for example, acetone and lower alkanols such as ethanol, is added to the cultivated microorganism under sterile conditions and the mixture agitated and aerated in order to bring about growth of the microorganism and oxygenation of the steroid substrate. The steroid may be added when the medium is seeded under sterile conditions with a culture of the microorganism or after growth of the organism is established.

In some cases it may be found advisable to add the steroid compound after growth of the microorganisms has been established in the nutrient medium under aerobic conditions. This is particularly true, if during the initial stages of growth of the microorganism, there is a tendency to produce undesired by-products from the steroid substrate. The acetate or other lower alkanoic ester of the selected steroid may be used in place of the alcohol itself. Best results are obtained when, after growth of the organism is established, the medium is diluted with an approximately equal volume of water either before or immediately after addition of the steroid substrate. Alternatively, enzyme preparations from the growth of the organism may be used for conducting the process. A further, most useful method is one in which the microorganism is grown on a suitable nutrient medium under aerobic conditions in the absence of the steroid. The mycelial growth may then be filtered from the broth and may, if desired, be washed with distilled water. The mycelium is then suspended in distilled water containing the steroid substrate. Agitation of the mixture and aeration is continued for a period of from about 12 to 48 hours after which the products of the reaction are recovered. This process has the advantage of ease of recovery of the steroid compound, since the various nutrient material originally used to obtain growth of the microorganisms is now absent as well as the various material excreted by the growth organism during the initial period. In some cases even better total yields of oxygenated products are obtained by this method than is the case when the steroid is added at the beginning or at an intermediate period directly to the whole fermentation broth. Other methods familiar to enzyme chemists may be utilized for conducting the present oxygenation process. The proportion of products and the rate of oxygenation as well as the nature of the by-products formed, may vary depending on the use of the whole fermentation broth or of the isolated washed mycelium.

In general, a concentration of not greater than one to two percent by weight of substrate based on the total weight is used in conducting this process, although sometimes other concentrations may be found to be more favorably used. Since the solubility of the starting material in water is quite limited, an excess of the material may be slowly converted to the oxygenated product. However, the state of subdivision of the steroid when added to the oxygenating system, i.e. growing microorganism or enzyme system, does not seem to greatly affect the yield and nature of the product under otherwise identical conditions. If a water-miscible solvent solution of the steroid compound is added to the aqueous fermentation system, the steroid is generally precipitated in finely divided form in the presence of a large excess of water. This does not seem to appreciably improve the rate of reaction as compared to the addition of dry, relatively large crystals of the steroid.

After completion of the oxygenating process, the product may be recovered from the mixture by extraction with a suitable water-immiscible solvent. Chlorinated lower hydrocarbons, ketones and alcohols are useful. These include chloroform, methylene chloride, trichloroethane, ethylene dichloride and so forth. The extract of product and unreacted starting material may be concentrated to a small volume or to dryness to obtain a solid product. Purification of the product may be accomplished in several ways. Most useful is the separation by means of chromatography of the product from starting material and from other products such as more highly oxygenated materials that may be formed during the reaction. Adsorbents such as silica gel, alumina or other suitable adsorbents are particularly useful for this purpose. It has been found that a column prepared from a mixture of silica gel and a lower alcohol, especially ethanol, is particularly useful for the separation of the steroid starting materials. The steroid mixtures may be applied to columns of adsorbents such as silica gel in concentrated chloroform or methylene chloride solution. The column may then be washed with additional amounts of the solvent to remove such impurities as fats and pigments. The adsorbed mixture then is separated by the gradual addition of a mixture of the solvent together with a small percentage, for example, 1 to 5% of a lower alcohol (methanol, ethanol, etc.). The materials may be separated and the separated compounds gradually eluted from the column by utilization of a mixture of solvents of gradually increasing polarity; for instance, a mixture of methylene chloride and a minor, gradually increasing amount of ethanol is very useful.

Fractions of the eluted materials from the chromatographic columns may be checked for the nature of the product by subjecting small portions of the solutions to chromatography on paper by methods well known in the art. Methods which are particularly useful for conducting this type of separation and analysis are described in detail in U.S. Patent No. 2,602,769, issued on July 8, 1952, to H. C. Murray et al., and in a publication by Shull, Abstracts, 126th Meeting of the American Chemical Society, p. 9A, New York, 1954.

The following examples are given solely for the purpose of illustration and are not to be construed as limitations of this invention, many apparent variations of which are possible without departing from the spirit or scope thereof.

Example I

An inoculum medium was prepared having the following composition:

|  | Percent |
| --- | --- |
| Cerelose (dextrose hydrate) | 1.0 |
| Yeast extract | 0.5 |
| N-Z Amine B (enzymatic digest of casein) | 1.0 |

The pH of the medium was adjusted to 6.7 with KOH and 0.1% of $CaCO_3$ added thereafter One liter portions of this medium were distributed in Fernbach flasks and sterilized by autoclaving for 30 minutes at 20 pounds/square inch pressure. Streptomyces ATCC No. 13278 was rinsed from an agar slant under sterile conditions into the sterile medium. The flasks, after inoculation, were then agitated on a rotary shaker at 28° C. for two days.

A production medium was prepared with the same composition as the inoculum. The medium was sterilized by autoclaving at 20 p.s.i. for one hour. Fermentation pots, fitted with mechanical agitators and submerged air delivery tubes containing the medium were inoculated with 5% of the two day old inoculum and then grown for 24 hours at 28° C. The medium was agitated at about 1700 r.p.m. and aerated at a rate of 0.5 volume per volume of medium per minute.

Sterile $9\alpha$-fluorohydrocortisone in an acetone solution was introduced into the broth, which had been diluted with an equal volume of water, at a concentration of about 250 mg. of steroid per liter of diluted broth. After addition of the steroid substrate, the mixture was maintained at 28° C. under the same conditions of agitation and aeration as previously described.

After 36 hours, little, if any, substrate remained, as shown by paper chromatography. After filtration of the mycelium, the broth was extracted three times with equal volumes of methylisobutylketone. The extracts were combined and concentrated under reduced pressure to obtain a dry residue.

The product was identified as $9\alpha$-fluoro-$16\alpha$-hydroxy hydrocortisone by comparison of its physical properties with an authentic sample.

Example II

The procedure of Example I is repeated with the exception that the steroid substrate is added to the product medium before growth following inoculation of the medium. Substantially the same results are obtained.

Example III

The procedure of Example I was repeated using Streptomyces ATCC 13279 in place of ATCC 13278, substantially the same results were obtained.

Example IV

The procedure of Example I was repeated using progesterone in place of $9\alpha$-fluorohydrocortisone. The product, $16\alpha$-hydroxyprogesterone, was identified by comparison of its physical properties with an authentic sample.

Example V

The procedure of Example III was repeated using testosterone as substrate, $16\alpha$-hydroxytestosterone was identified by comparison of its physical properties with an authentic sample.

Example VI

The procedures of Examples I and III were repeated using estradiol as substrate in place of $9\alpha$-fluorohydrocortisone. The product, estriol, was identified by comparison of its paper chromatogram with that of an authentic sample of estriol.

In like manner, the use of estrone as substrate produces $16\alpha$-hydroxyestrone.

Example VII

The mycelium from 100 ml. of the production medium of Example I is filtered after full growth is established and resuspended in 200 ml. of water. Twenty milligrams of $9\alpha$-fluoro-$\Delta^4$-pregnene-$17\alpha$,21-diol-3,11,20-trione ($9\alpha$-fluoro-cortisone) is added to this mixture and the mixture stirred and aerated at 28° C. for 36 hours.

The product, $16\alpha$-hydroxy-$9\alpha$-fluorocortisone, was identified by comparison of its physical properties with an authentic sample.

The following compounds are prepared using the procedures of Examples I through VI. The starting compounds are all known. The list is given to avoid unnecessary repetition of experimental details.

$16\alpha$-hydroxycorticosterone
$16\alpha$-hydroxydesoxycorticosterone
$16\alpha$-hydroxycortisone
$\Delta^5$-pregnene-$3\beta$,$16\alpha$-diol-20-one
$16\alpha$-hydroxydehydroisoandrosterone
$\Delta^{1,4}$-pregnadiene-$11\beta$,$16\alpha$,$17\alpha$,21-tetrol-3,20-dione
$16\alpha$-hydroxy-$9\alpha$-methoxycortisone
$16\alpha$-hydroxy-$9\alpha$-ethoxyhydrocortisone
$\Delta^{4,9(11)}$-pregnadiene-$16\alpha$,$17\alpha$,21-triol-3,20-dione
$6\alpha$-fluoro-$\Delta^4$-pregnene-$11\beta$,$16\alpha$,$17\alpha$,21-tetrol-3,20-dione
$2\alpha$-methyl-$6\alpha$-fluoro-$\Delta^4$-pregnene-$11\beta$,$16\alpha$,$17\alpha$,21-tetrol-3,20-dione
$16\alpha$-hydroxy-$\Delta^{4,6}$-hydrocortisone
$16\alpha$-hydroxy-$6\alpha$-methyl-$\Delta^1$-hydrocortisone
$11\beta$,$14\alpha$,$16\alpha$,$17\alpha$,21-pentahydroxyprogesterone
$9\alpha$-fluoro-$17\beta$-pyruvoyl-$\Delta^4$-androstene-$11\beta$,$16\alpha$,$17\alpha$-triol-3-one
$16\alpha$-hydroxy-19-nortestosterone

What is claimed is:
1. A process for the production of $16\alpha$-hydroxylated steroids which comprises subjecting a steroid containing a 16 methylene group and having from 18 to 22 carbon atoms in the carbon skeleton to the oxygenating activity of a microorganism selected from the group consisting of

Streptomcyces ATCC 13278 and Streptomyces ATCC 13279 under aerobic conditions.

2. A process as claimed in claim 1 in which the mycelium is first separated from the broth and the steroid compound is then contacted with an aqueous suspension of the mycelium.

3. A process as claimed in claim 1 wherein the steroid is 9α-fluoro-hydrocortisone.

4. A process as claimed in claim 1 wherein the steroid is progesterone.

5. A process as claimed in claim 1 wherein the steroid is testosterone.

6. A process as claimed in claim 1 wherein the steroid is 9α-fluoro-cortisone.

7. A process as claimed in claim 1 wherein the steroid is corticosterone.

8. A process as claimed in claim 1 wherein the steroid is prednisolone.

References Cited in the file of this patent

UNITED STATES PATENTS

| | | |
|---|---|---|
| 2,709,705 | Perlman et al. | May 31, 1955 |
| 2,855,343 | Fried et al. | Oct. 7, 1958 |
| 2,864,836 | Lincoln et al. | Dec. 16, 1958 |